United States Patent
Haferbeck et al.

(10) Patent No.: US 6,256,297 B1
(45) Date of Patent: Jul. 3, 2001

(54) METHOD FOR TRANSMITTING INFORMATION IN A UNIVERSAL TRANSMISSION NETWORK

(75) Inventors: Ralf Haferbeck, Unterschleissheim; Detlef Ernst, Oberhaching, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/091,779

(22) PCT Filed: Dec. 2, 1996

(86) PCT No.: PCT/DE96/02306

§ 371 Date: Jun. 19, 1998

§ 102(e) Date: Jun. 19, 1998

(87) PCT Pub. No.: WO97/23105

PCT Pub. Date: Jun. 26, 1997

(30) Foreign Application Priority Data

Dec. 19, 1995 (DE) .............................................. 195 47 468

(51) Int. Cl.$^7$ ...................................................... H04J 1/16
(52) U.S. Cl. ........................................... 370/310; 370/216
(58) Field of Search ..................................... 370/311, 465, 370/395, 389, 328, 466, 335, 342, 349, 479, 401, 332, 336, 407, 408, 409, 351, 352, 216, 218, 217, 227, 228, 509, 501, 310; 455/403, 422, 455, 464, 38.3; 340/825.01, 827; 379/221

(56) References Cited

U.S. PATENT DOCUMENTS 5,101,501 3/1992 Gilhousen et al. .
6,049,543 * 4/2000 Sauer et al. .......................... 370/328

FOREIGN PATENT DOCUMENTS 0 643 542 A1 3/1995 (EP) .
0 679 042 A2 10/1995 (EP) .

OTHER PUBLICATIONS

IEEE Journal on Selected Areas in Communications 12(1994) Jun., No. 5, New York, pp. 900–908.

* cited by examiner

*Primary Examiner*—Dang Ton
(74) *Attorney, Agent, or Firm*—Bell, Boyd & Lloyd LLC

(57) ABSTRACT

A method for transmitting information in a universal transmission network wherein
information about the total number of combination points at which two transmission paths are combined to form a single transmission path a or an individual transmission path is split into two transmission paths a is entered in a transmission frame by a radio subscriber station which uses a plurality of redundant transmission paths set up in parallel via a radio. The number of combination points which the incoming transmission frame has passed through is determined at the combination points in the transmission network, and information about this is also transmitted in an outgoing transmission frame. In consequence, the combination point at which the total number of combination points required in the network is reached can be selected in a dynamic and flexible manner as the interworking point in the transmission network for conversion of information encoded specifically for mobile radio networks.

7 Claims, 1 Drawing Sheet

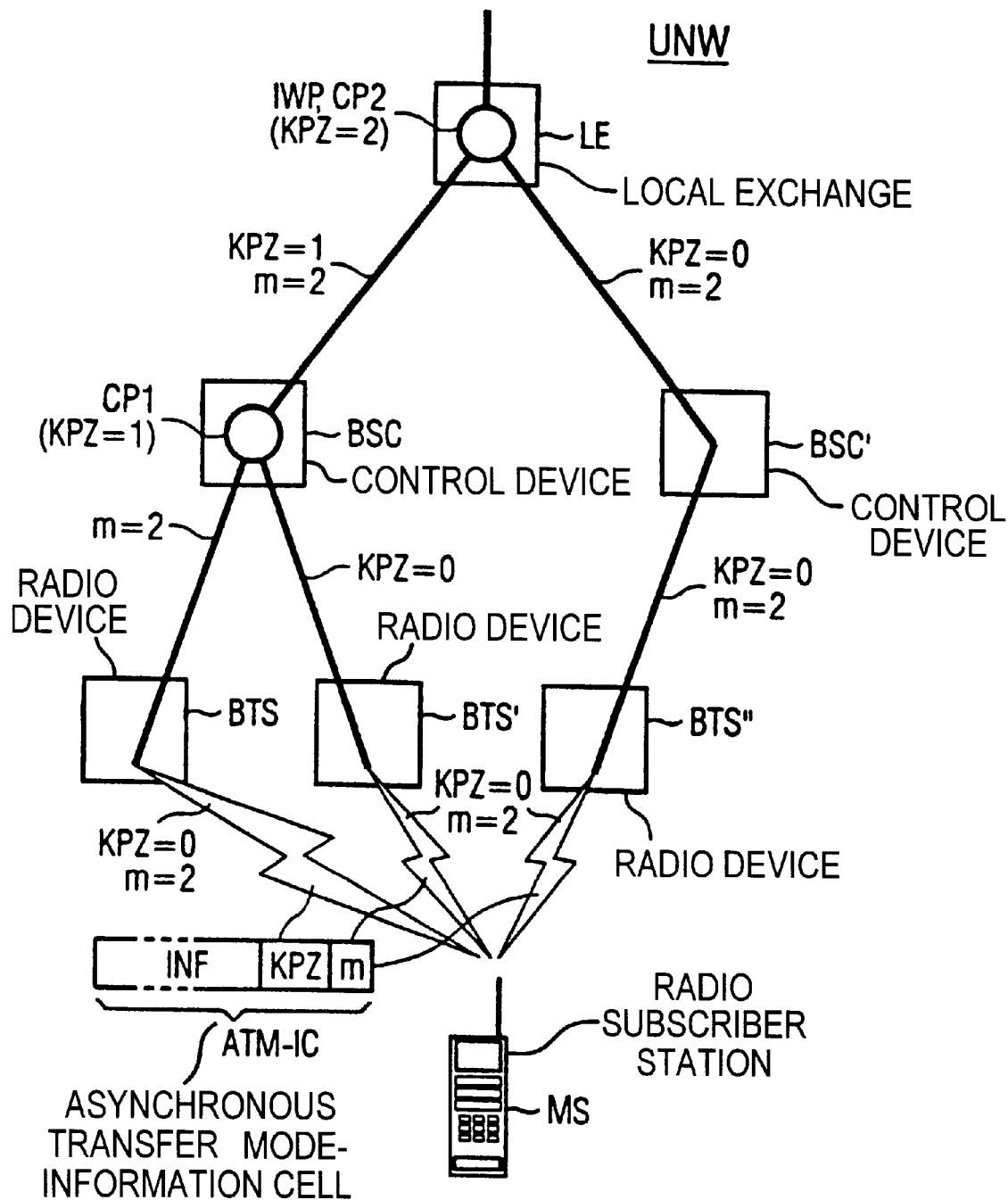

METHOD FOR TRANSMITTING INFORMATION IN A UNIVERSAL TRANSMISSION NETWORK

The Present invention relates to a method for transmitting information in a universal transmission network in which both functions that are specific for mobile radio and functions that are specific for fixed networks are carried out, in a particularized fashion for mobile communications.

DESCRIPTION OF THE PRIOR ART

Universal transmission networks (UMTS Universal Mobile Telecommunications System, FPLMTS Future Public Land Mobile Telecommunications System) are known from the article "Mobilkommunikation auf Expansionskurs" [Mobile communication on an expanding market] in telcom report 18 (1995), Issue 2, pages 52 to 55, in which different networks and network services are combined to form personal mobile telecommunication. For the network subscribers—irrespective of whether they are mobile radio subscribers or fixed network subscribers—this results in universal access to a transmission network in which functions related to mobile radio networks and functions related to fixed networks are carried out for voice, data and video communications.

As is known, the same information can be transmitted on a plurality of redundant transmission paths by, such transmission paths are set up in parallel via a radio transmission interface from the network to the radio subscriber station a or from the radio subscriber station to the transmission network (macro diversity a) in order to achieve transmission quality which in as good as possible. This means that the signalling and/or wanted information which is normally inserted into one or more transmission frames is received by a plurality of radio devices; for example a base transmitting/receiving stations in the transmission network. The information transmission via parallel redundant transmission paths is used, for example, in a radio transmission interface which employs the CDMA (Code Division Multiple Access) access method in accordance with U.S. Pat. No. 5,101,501. The redundant transmission paths can be met up and cleared dow dynamically while the radio subscriber station changes its location. Operation in this transmission mode (macro diversity) is also possible over a relatively long time period in the case of a fixed-position radio subscriber station.

In an ATM network which uses a radio interface for transmitting information from and to a mobile station, it is known from EP-A-0 679 042 for improved transmission quality to be achieved by the mobile station setting up redundant paths. The greater transmission capacity required for this purpose an for the transmission of ATM cells in the access network between base stations to which the mobile station is connected by radio and a mobile network interface unit a is reduced in that subnetworks are formed in the access network and redundant paths are combined and split in the interfaces of these networks (subnetwork interfaces).

The information which is transmitted from the radio subscriber station in the transmission frame on different transmission paths can be combined in the transmission network at combination points at such combination points two transmission paths are combined to form a single transmission path in one transmission direction (uplink), and the single transmission path is split into two transmission paths in the other transmission direction (downlink). The number and distribution of the combination points between network elements in the transmission network changes dynamically with the addition or removal of redundant transmission paths which can additionally be met up and cleared down again by the radio subscriber station.

To achieve the best possible utilization of the network elements in the universal transmission network, it is necessary to define an interworking point at which information encoded specifically for mobile radio must be converted into information coded specifically for fixed networks. Since the interworking point terminates all the functions specific for mobile radio, conversion cannot be carried out until after all the combination points when a plurality of redundant transmission paths are present in the transmission network. The dynamic addition and removal of redundant transmission paths result in changes in the number and distribution of the combination points and a thus a in the definition of the interworking point in the transmission network.

SUMMARY OF THE INVENTION

It is thus an object of the present invention to specify a method by which the interworking point in the transmission network can be defined in a flexible manner when redundant transmission paths are being set up and cleared down dynamically (macro diversity).

As a result of the fact that the radio subscriber station knows the number of parallel transmission paths, which number changes dynamically, information about the total number of combination points required in the transmission network is entered by said station in the transmission frame in accordance with the teachings of the present invention. The number of combination points which the incoming transmission frames have passed through is in each case determined at the combination points in the transmission network, and information about this is also transmitted in the outgoing transmission frame. The combination point at which the total number of combination points in reached is selected in a dynamic and flexible manner, at each combination point, as the interworking point in the transmission network such is complished by virtue of the knowledge of the total number of the combination points and the number of combination points which have already been passed through.

The interworking point for conversion of the information encoded specifically for mobile radio networks into information encoded specifically for fixed networks is also localized by the method according to the present invention, when redundant transmission paths are set up and cleared down dynamically (macro diversity), wherever a combination point combines the last two transmission paths. In this case, the method according to the present invention also has the advantage that no additional signalling complexity in the form of signalling messages is required to define the optimum interworking point when using the "macro diversity" transmission mode. It is sufficient if the interworking point is selected on the basis of the new information which is also transmitted in each case. Despite redundant transmission paths being set up and cleared down dynamically on the radio transmission interface, this ensures that the interworking point is located in a network element in a transmission network which—from the point of view of the various network levels in a network—is as "close" as possible to a radio subscriber station.

According to a development of the present invention, the information about the number of combination points which have already been passed through is entered in the outgoing transmission frame until the total number of combination points is reached.

According to another development of the present invention, a combination point counter is inserted in the transmission frame in order to determine the number of combination points which have passed through, such that the current counts of the combination point counters which are contained in the incoming transmission frames can be added at each combination point. The count resulting from the addition is incremented by one in the respective combination point and the result compared for correspondence with the total number of combination points entered in the transmission frame. As soon as the resultant count of the combination point counter at a combination point reaches the value for the total number of combination points, all the combinations of redundant transmission paths in the transmission network have been carried out. The conversion of the information encoded specifically for mobile radio networks into information encoded specifically for fixed networks can thus be carried out at this combination point and by the corresponding network element. Additional features and advantages of the present invention are described in, and will be apparent from, the Detailed Description of the Preferred Embodiments and from the Drawings.

DESCRIPTION OF THE DRAWINGS

FIG. 1 shows the information flow on various redundant transmission paths, which are combined at combination points in a universal transmission network.

DETAILED DESCRIPTION OF THE PREFERRED EMBODIMENTS

The block diagram of FIG. 1 show the network elements in a universal transmission network UNW in which both information encoded specifically for mobile radio networks and information encoded specifically for fixed networks in transmitted for personal mobile communication between network subscribers. The universal transmission network UNW makes it possible for network subscribers In different access networks, such as a mobile radio network and a fixed network, to carry out personal mobile communication independently of the respective access network. In the present example, the transmission network UNW has as network elements a plurality of radio devices BTS, BTS' and BTS", a plurality of control devices BSC and BSC' and at least one exchange LE. There are, of course, other network elements, but theme are not required for an understanding of the invention. The radio devices BTS, BTS' and BTS" receive the information which is transmitted from a radio subscriber station NS to the network in the uplink transmission direction, and transmit the information which is received from the transmission network in the downlink transmission direction via a radio transmission interface in each case. At the same time, each radio device BTS . . . BTS normally operates one radio cell which represents the smallest radio supply area in a network of cellular structure. A radio cell can be split by using directional antennas at one location of the radio device BTS . . . BTS into two or more sectorized cells which are handled by the network as normal radio cells.

The control devices BSC and BSC' carry out the radio control functions in the transmission network such as the radio processing functions, the administration of the radio devices, radio channel administration a etc.,. In this case, each control device BSC or BSC' operates one or more radio devices BTS . . . BTS". The exchange LE in connected to the control devices BSC and BSC' and is arranged with other exchanges in the switching system of the transmission network. At the same time, the switching system carries out all the switching functions specific for mobile radio networks and all the switching functions specific for fixed networks which relate to setting up and clearing down call connections and routing in the universal transmission network. In the present example, the exchange LE comprises a local exchange as used, for example, for switching a fixed network in locally bounded regions.

The radio subscriber station MS operates in a transmission mode in which a plurality of redundant transmission paths are sot up in parallel to the radio devices BTS . . . BTS" at the same time for a logic link (macro diversity). This means that the same information which is entered in mutually corresponding transmission frames is received by the radio devices BTS . . . BTS" via the radio transmission interface. In this case, the transmission frames contain information encoded specifically for mobile radio networks and which may be signalling information as well an voice and data information. As a result of the fact that a total of m+1 transmission paths have been net up in parallel by the radio subscriber station MS, information about the total number of m combination points required to combine two transmission paths in each case can be entered by the radio subscriber station MS in the respective transmission frame to be transmitted. In the present example, a total of m+1=3 redundant transmission paths are set up in parallel so that the information from two incoming transmission frames is combined in the transmission network at m=2 combination points CP1 and CP2 to form information in an outgoing transmission frame. In addition to the information about m combination points, a combination point counter KPZ is added in the respective transmission frame and is set to the count 0 at the start of each information transmission.

In the present example, the information INF encoded specifically for mobile radio networks is located in a transmission frame which is an information cell ATM-IC formed using the asynchronous transfer mode (ATM). As is known, each ATM information cell ATM-IC has a header with a length of 5 bytes and an information field (payload) with a length of 48 bytes. Half an information byte is sufficient in each ATM information cell for the combination point counter KPZ and for the total number m of combination points for a maximum of m+1=4 parallel transmission paths a thus a maximum total number of m=3 combination points. In this case, two bits are reserved for the combination point counter KPZ and two bits are reserved for the total number m. Overall, the information transmission capacity in the ATM information call is reduced only slightly as a result of the newly included information KPZ, m (4 bits out of 48 information bytes). The information INF encoded specifically for mobile radio networks, the combination point counter KPZ and the information about the total number m of combination points can also be transmitted in information blocks using a synchronous or plesiochronous transfer mode (SDH or PDH).

In the present example, two redundant transmission paths are set up by the radio subscriber station MS to radio devices BTS and BTS', and a third transmission path is set up to the radio device BTS". However, in principle it is also possible to set up and clear down redundant transmission paths from the transmission network to the radio subscriber station. At the start of information transmission, the combination point counter KPZ is at the count KPZ=0 (in decimal form) and the total number m of combination points in at the value m=2 (in decimal form). The two incoming transmission frames having the identical information are passed on by the radio devices BTS and BTS' to the control device BSC on two transmission paths. The information received in the corresponding transmission frame is sent by the radio device BTS" to the control device BSC' via the third transmission path. The identical information arriving on the two transmission paths is combined at a combination point CP1 in the control device BSC. At the same time, the number of combination points which have already been passed through by the two incoming transmission frames is determined in such a manner that the current counts of the combination point counters KPZ in the transmission frames are added, and the count resulting from the addition is incremented by one. The number of combination points which have already been passed through resulting from this and which, in the present example, gives the new count KPZ=1 (from 0+0+1) for the combination point counter KPZ, is entered in the outgoing transmission frame and is transmitted together with the unchanged total nuder m=2 of combination points on the single outgoing transmission path to the exchange LE.

The information which is received by the control device BSC' on the single transmission path is passed on directly to the exchange LE without it being necessary to combine two redundant transmission paths at a combination point. The information contained in the transmission frame about the total number a of combination points and about the number of combination points which have already been passed through, identifiable from the combination point counter KPZ, thus retains the originally entered values KPZ=0 and m=2 (each in decimal form). The two single transmission paths, which have been set up by the control devices BSC and BSC', are combined in the exchange LE at a combination point CP2. The information contained in the two incoming transmission frames is once again combined and entered in an outgoing transmission frame which is transmitted on a single connecting path from the exchange LE. The number of combination points which the incoming transmission frames have already passed through is determined once again at the combination point CP2 in the exchange LE a using the method described above, so that the combination point counter KPZ is set to a now count of KPZ=2 (from 1+0+1). The comparison of the new count for the combination point counter KPZ with the total number m of combination points produces correspondence so that the combination point CP2 located in the exchange LE is selected as the interworking point IWP in the transmission network, at such interworking point a the information encoded specifically for mobile radio networks and contained in the transmission frame is converted into information encoded specifically for fixed networks for further processing in downstream network elements in the transmission network.

As soon as the radio subscriber station MS clears down or adds one of the redundant transmission paths on the radio transmission interface, the total number m of combination points in the network changes. If a redundant transmission path in removed, then there is only one combination point CP1 which is arranged in the control device BSC and which is selected as the new interworking point using the method according to the present invention. If a further redundant transmission path is added which is set up to a radio device that is not illustrated, two transmission paths are also combined in the control device BSC' at a combination point. As before, the combination point CP2 which is located in the exchange LE is selected as the interworking point IWP in the transmission network, since the total number m a of the total of three combination points which have been passed through a is identified using the method according to the present invention. Although the present invention has been described with reference to specific embodiments, those of skill in the art will recognize that changes may be made thereto without departing from the spirit and scope of the invention as set forth in the hereafter appended claims.

What is claimed is:

1. A method for transmitting information in a universal transmission network in which functions specific to mobile radio networks and functions specific to fixed networks are performed, the method comprising the steps of:

transmitting the information in transmission frames between the transmission network and a radio subscriber network on different redundant transmission paths set up in parallel via a radio transmission interface;

combining the information at combination points at which two first transmission paths are combined to form a first single transmission path in a first transmission direction, the first single transmission path thereafter split into two second transmission paths in a second transmission direction opposite the first transmission direction;

entering total combination point information in each transmission frame by the radio subscriber station, the total combination point information being a total number m of the combination points used for combining m+1 transmission paths set up in parallel;

determining partial combination point information at each combination point, the partial combination point information equal to a number of the combination points through which a plurality of incoming transmission frames pass;

transmitting the partial combination point information in an outgoing transmission frame;

selecting as an interworking point in the transmission network a combination point at which the total number m of the combination points passed through is reached; and converting information encoded specifically for mobile radio networks in each transmission frame into information encoded specifically for the fixed networks.

2. A method for transmitting information in a universal transmission network as claimed in claim 1, further comprising the step of:

entering the partial combination point information in the outgoing transmission frame at each combination point until the total number m of the combination points is reached.

3. A method for transmitting information in a universal transmission network as claimed in claim 1, further comprising the steps of:

inserting a combination point counter in each of the transmission frames to determine the total number m of the combination points passed through;

adding current counts of the combination point counters in each of the respective transmission frames on the two first transmission paths at each combination point to obtain a total count; and incrementing the total count by one to obtain a new total count and comparing the new total count with the total number m of the combination points.

4. A method for transmitting information in a universal transmission network as claimed in claim 1, wherein the interworking point is located in a radio device in the transmission network.

5. A method for transmitting information in a universal transmission network as claimed in claim 1, wherein the interworking point is located in an exchange in the transmission network.

6. A method for transmitting information in a universal transmission network as claimed in claim 1, further comprising the steps of:
   using an information cell, which is transmitted using an asynchronous transfer mode, as the transmission frame for the information encoded specifically for mobile radio networks; and
   inserting into the information cell both the total combination point information and the partial combination point information.

7. A method for transmitting information in a universal transmission network as claimed in claim 1, further comprising the steps of:
   using an information block, which is transmitted using an asynchronous transfer mode, as the transmission frame for the information encoded specifically for mobile radio networks; and
   inserting into the information block both the total combination point information and the partial combination point information.

* * * * *